(12) United States Patent
She et al.

(10) Patent No.: US 12,434,278 B2
(45) Date of Patent: Oct. 7, 2025

(54) PIPE CLEANER AND PIPELINE CLEANING SYSTEM

(71) Applicant: CONTEMPORARY AMPEREX TECHNOLOGY (HONG KONG) LIMITED, Hong Kong (CN)

(72) Inventors: Zhiqiang She, Fujian (CN); Sanliu Huang, Fujian (CN); Longchang Sun, Fujian (CN); Guangcheng Zhong, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 211 days.

(21) Appl. No.: 18/238,528

(22) Filed: Aug. 28, 2023

(65) Prior Publication Data

US 2024/0139785 A1    May 2, 2024

Related U.S. Application Data

(63) Continuation of application No. PCT/CN2023/084554, filed on Mar. 29, 2023.

(30) Foreign Application Priority Data

Oct. 27, 2022   (CN) .................. 202222835385.6

(51) Int. Cl.
*B08B 9/043*     (2006.01)
*B08B 1/12*      (2024.01)
(Continued)

(52) U.S. Cl.
CPC .............. *B08B 9/0436* (2013.01); *B08B 1/12* (2024.01); *B08B 9/055* (2013.01); *B08B 9/0552* (2013.01); *F16L 55/28* (2013.01)

(58) Field of Classification Search
CPC ....... B08B 9/0552; B08B 9/055; B08B 9/057; B08B 9/0557; B08B 9/0554;
(Continued)

(56) References Cited

U.S. PATENT DOCUMENTS 3,732,434 A   5/1973  French
4,550,466 A   11/1985 Schmitz
(Continued)

FOREIGN PATENT DOCUMENTS

CN    205762788 U    12/2016
CN    207188388 U    4/2018
(Continued)

OTHER PUBLICATIONS

English translation of KR 2010-0137969 A, Hong, Dec. 31, 2010. (Year: 2010).*
(Continued)

*Primary Examiner* — Laura C Guidotti
(74) *Attorney, Agent, or Firm* — XSENSUS LLP

(57) ABSTRACT

The present application relates to a pipe cleaner and a pipeline cleaning system, the pipe cleaner is applied to a to-be-cleaned pipeline, the pipe cleaner may comprise a body, and a cleaning portion may be arranged on the surface of the body; wherein the cleaning portion may be configured as a conductive structure, and when the body moves along the pipeline, the cleaning portion can push out dust particles in the pipeline to the tail end of the pipeline and guide out static electricity generated by friction with the pipeline.

18 Claims, 4 Drawing Sheets

(51) Int. Cl.
  *B08B 9/055* (2006.01)
  *F16L 55/28* (2006.01)
(58) Field of Classification Search
  CPC .......... B08B 9/0553; B08B 1/12; F16L 55/40; F16L 55/28; A46B 15/0018; A46B 15/002; A46B 2200/3013; A46B 3/005
  USPC .......................................................... 165/95
  See application file for complete search history.

(56) References Cited

U.S. PATENT DOCUMENTS 7,419,626 B2 * 9/2008 Mark ................. B29C 45/2626
          425/805
2018/0149301 A1   5/2018 Aslam

FOREIGN PATENT DOCUMENTS

| CN | 218340560 U | 1/2023 | | |
|---|---|---|---|---|
| DE | 102006035258 A1 | 2/2007 | | |
| EP | 1074312 A1 | 2/2001 | | |
| JP | H11-179308 A | 7/1999 | | |
| JP | 2001-087727 A | 4/2001 | | |
| KR | 2010-0137969 A | 12/2010 | | |
| WO | WO 9535172 A2 * | 12/1995 | ........... | B08B 9/0552 |

OTHER PUBLICATIONS

English translation of CN 205762788 U, Jian et al., Dec. 7, 2016. (Year: 2016).*
English translation of EP 1074312 A1, Auchter et al., Feb. 7, 2001. (Year: 2001).*
Dictionary Definition: Rugby Ball, Cambridge English Dictionary (Year: 2025).*
Extended European Search Report issued Sep. 27, 2024 in European Patent Application No. 23754698.1.
International Search Report mailed on Jun. 20, 2023, received for PCT Application PCT/CN2023/084554, filed on Mar. 29, 2023, 7 pages including English Translation.

* cited by examiner

PIPE CLEANER AND PIPELINE CLEANING SYSTEM

CROSS-REFERENCE TO RELATED APPLICATIONS

The present application is a continuation of International Application No. PCT/CN2023/084554, filed Mar. 29, 2023, which claims priority to Chinese Patent Application CN202222835385.6, filed on Oct. 27, 2022, and entitled "PIPE CLEANER AND PIPELINE CLEANING SYSTEM", the entire contents of each of which are incorporated herein by reference.

TECHNICAL FIELD

The present application relates to the technical field of pipeline cleaning, and in particular, to a pipe cleaner and a pipeline cleaning system.

BACKGROUND

Pipeline is a device that is coupled by pipes, pipe couplers, and valves etc. for delivering gas, liquid, or fluid with solid particles.

For some pipelines used to deliver dust particles, after long-term use of the pipeline, dust particles are often attached to the pipeline. Currently, a pigging ball for cleaning the pipeline is commonly used, the pigging ball is put into the to-be-cleaned pipeline, and then moves along the pipeline to remove the dust particles attached to the inner wall of the pipeline.

However, for some pipelines containing hazardous dust particles such as flammable and explosive materials (such as aluminum powder and magnesium powder), due to limitations such as related structure and material of the pigging ball, during the cleaning process of the pigging ball moving along the pipeline, static electricity may be generated due to the contact and friction the pipe wall. When there is enough static electricity accumulates on the pigging ball, it will react with hazardous dust particles, causing safety accidents such as combustion or even explosion, resulting in corresponding economic losses.

SUMMARY OF THE DISCLOSURE

Embodiments of the present application are intended to solve at least one of the technical problems existing in the prior art. To this end, an embodiment of the present application provides a pipe cleaner and a pipeline cleaning system, which is capable of effectively guiding out static electricity generated by friction between the pipe cleaner and the pipe wall during the process of cleaning dust particles in the pipeline with the pipe cleaner, and effectively preventing static electricity from accumulating on the surface of the pipe cleaner and reacting with hazardous dust particles, thereby not only ensuring the cleaning effect for the pipeline, but also ensuring safety in the process of cleaning dust particles in the pipeline with the pipe cleaner, and safety accidents such as combustion and explosion are avoided.

In a first aspect, an embodiment of the present application provides a pipe cleaner, the pipe cleaner is applied to a to-be-cleaned pipeline, which comprises:

a body, a cleaning portion is provided on the surface of the body;

wherein the cleaning portion is configured as a conductive structure, and when the body moves along the pipeline, the cleaning portion is capable of pushing out dust particles in the pipeline to the tail end of the pipeline, and guide out static electricity generated by friction with the pipeline.

The pipe cleaner according to the first aspect of the present application has at least the following beneficial effects:

In the pipe cleaner of the present application, by providing a corresponding cleaning portion on the surface of the body, the cleaning portion is capable of pushing out dust particles in the pipeline to the tail end of the pipeline when the pipe cleaner moves in the to-be-cleaned pipeline, and at the same time, the cleaning portion is able to contact and friction with the inner wall of the pipeline so as to push down the dust particles attached to the inner wall of the pipeline, so that the dust particles attached to the inner wall of the pipeline and the dust particles in the pipeline are pushed out to the tail end of the pipeline together, thereby completing the cleaning of the pipeline. In addition, in the present application, by arranging the cleaning portion as a conductive structure, it is able to utilize the conductivity of the cleaning portion to effectively guide out the static electricity generated by friction between the cleaning portion and the pipe wall through the pipeline during the process of cleaning dust particles in the pipeline with the pipe cleaner; and effectively prevent the static electricity from being accumulated at the cleaning portion and the surface of the pipe cleaner and reacting with hazardous dust particles, thereby not only ensuring the cleaning effect for the pipeline, but also ensuring safety in the process of cleaning dust particles in the pipeline with a pipe cleaner, and safety accidents such as combustion and explosion are avoided.

In some embodiments, the cleaning portion is a plurality of conductive brushes arranged on the surface of the body. By means of the above arrangement, it is ensured that the cleaning portion effectively guide out static electricity generated by friction with the inner wall of the pipeline through the pipeline, at the same time, by arranging the cleaning portion to be of a conductive brush structure, on one hand, it is capable of adapting to the granular dust particles exist in the pipeline, which enables a small amount of dust particles floating in the pipeline to contact with the conductive brushes and thereby attaching to the conductive brushes during the process of pushing the dust particles in the pipeline towards the tail end of the pipeline as a whole by the pipe cleaner, and then being carried out by the pipe cleaner and removed, thereby improving the cleaning quality of the pipeline; on the other hand, by arranging the cleaning portion to be of a conductive brush structure, so that the manner of frictional contact between the cleaning portion and the inner wall of the pipeline is point contact, the thrust of the cleaning portion on the dust particles attached to the inner wall of the pipeline is increased, thereby ensuring that the dust particles attached to the inner wall of the pipeline can be completely brushed off by the conductive brushes, avoiding remaining of the dust particles on the inner wall of the pipeline, and further improving the cleaning quality of the pipeline.

In some embodiments, the area occupied by the cleaning portion on the surface of the body is 65% to 80% of the surface area of the body. By means of the above arrangement, when the cleaning portion is conductive brushes arranged on the surface of the body, excessive density of the conductive brushes distributed on the surface of the body is avoided, thereby preventing the pipe cleaner from being clogged in the pipeline during the process of cleaning the pipeline; meanwhile, low density of the conductive brushes distributed on the surface of the body is also avoided, thereby ensuring the cleaning effect of the cleaning portion on the pipeline.

In some embodiments, the cross-sectional shape of the body is adapted to the cross-sectional shape of the pipeline. By means of the above arrangement, it is ensured that the shape of the body is effectively adapted to the cross-sectional shape of the pipeline, and it is ensured that the pipe cleaner can smoothly roll or move along the pipeline, thereby further preventing the pipe cleaner from being clogged in the pipeline.

In some embodiments, the body is of a spherical shape. Arranging the body in a spherical shape enables the body and the entire pipe cleaner to be adapted to a complex structure of the pipeline, and enables the pipe cleaner to clean the pipeline in a rolling manner, meanwhile, for some bended pipelines, the pipe cleaner can also change the rolling direction accordingly with the trajectory of the pipeline so as to prevent the pipe cleaner from being clogged at a corner or round transition area of the pipeline.

In some embodiments, the length of the cleaning portion is 15% to 20% of the diameter of the body. By means of the above arrangement, excessive length of the cleaning portion is avoided when it is conductive brushes, which further prevented the pipe cleaner from being clogged in the pipeline during the process of cleaning the pipeline, enabling the overall volume of the pipe cleaner to be better adapted to the inner diameter of the pipeline, and better cleaning effect of the cleaning portion on dust particles attached to the inner wall of the pipeline is ensured.

In some embodiments, the material of the cleaning portion comprises one of carbon fiber and modified nylon. By means of the above arrangement, the material for manufacturing the cleaning portion is selected from one of carbon fiber and modified nylon, which not only ensures a good electrostatic conductivity of the cleaning portion, but also significantly reduces the weight of the cleaning portion due to the fact that the feature that the carbon fiber and modified nylon are light-weight materials, and further reduces the structural weight of the entire pipe cleaner, so as to maintains good lightness of the pipe cleaner and improve the cleaning efficiency of the pipe cleaner on dust particles in the pipeline.

In some embodiments, the body is configured as a conductive structure. By means of the above arrangement, the body is made as a conductor, which prevents static electricity generated by friction between the cleaning portion and the pipe wall during the process of cleaning dust particles in the pipeline with a pipe cleaner from accumulating on the surface of the body, and ensures that the body is capable of directly guiding out static electricity on the surface thereof through the pipeline, or indirectly guiding out static electricity on the surface of the body through contact between cleaning portion on the body and the pipeline, which further prevents static electricity from accumulating on the body and the cleaning portion, ensuring safety in the process of cleaning dust particles in the pipeline with a pipe cleaner, and avoiding safety accidents such as combustion and explosion.

In some embodiments, the interior of the body is provided with a magnetic positioning member. By means of the above arrangement, it is convenient for the operator to configure a magnetic sensor that is inductively fitted with the magnetic positioning member on the pipeline, so that the magnetic sensor is able to sense the position of the pipe cleaner in the pipeline, realizing real-time positioning of the pipe cleaner moving in the pipeline, and simplifying the difficulty for operators to solve blockages or other faults in the pipeline.

In a second aspect, an embodiment of the present application provides a pipeline cleaning system, including:
a pipeline; and the above-described pipe cleaner; wherein the pipe cleaner is movably arranged in the pipeline and is able to move along the pipeline.

The pipeline cleaning system according to the second aspect of the present application has at least the following beneficial effects:

The pipeline cleaning system in the present application is provided with the above described pipe cleaner, therefore, it also has the same technical effect brought by the pipe cleaner, that is, the conductivity of the cleaning portion on the surface of the pipe cleaner body can be utilized, so as to effectively guide out the static electricity generated by friction between the cleaning portion and the pipe wall through the pipeline during the process of cleaning dust particles in the pipeline with the pipe cleaner, and effectively prevent the static electricity from accumulating on the cleaning portion and the surface of the pipe cleaner and reacting with hazardous dust particles, thereby not only ensuring the cleaning effect for the pipeline, but also ensuring the safety during the process of moving the pipe cleaner along the pipeline and cleaning dust particles in the pipeline, and safety accidents such as combustion and explosion are avoided.

In some embodiments, the pipeline cleaning system further includes a gas delivery device, an outer wall of the pipeline is provided with a gas inlet for communicating with an outlet end of the gas delivery device, the gas delivery device is used to deliver inert gas into the pipeline to drive the pipe cleaner to move along the pipeline. By means of the above arrangement, on one hand, the gas delivery device injects inert gas into the pipeline, ensuring that the pipe cleaner is driven by a driving force to move along the pipeline, so that the pipe cleaner is moved forward from the front end of the pipeline to the tail end of the pipeline, so as to push out dust particles in the pipeline and dust particles attached to the inner wall of the pipeline, thereby completing overall cleaning of the pipeline; on the other hand, by using the inert gas as a power source for pushing the pipe cleaner to move along the pipeline, and utilizing the feature that the inert gas does not react with other substances, chemical reaction between inert gas has and the hazardous dust particles in the pipeline is directly avoided. In addition, the inert gas also has an effect of making the hazardous dust particles inert to some extent, that is, inerting explosion suppression is applied to the hazardous dust particles, thereby further avoiding safety accident such as combustion and explosion.

In some embodiments, the inert gas is nitrogen. By means of the above arrangement, the cost of power source for pushing the pipe cleaner to move along the pipeline is reduced, meanwhile, the safety during the process of moving the pipe cleaner along the pipeline and cleaning dust particles in the pipeline is further ensured.

In some embodiments, the tail end of the pipeline is connected with a dust treatment device, the dust treatment device is capable of applying a negative pressure to the pipeline by means of pumping, and used for receiving dust particles in the pipeline and the pipe cleaner attached with dust particles. By means of the above arrangement, on one hand, the dust treatment device is capable of sucking out the floating dust particles in the pipeline during the process of applying a negative pressure to the pipeline by means of pumping, thereby improving the pipeline cleaning efficiency; on the other hand, the dust treatment device also serves to receive the pipe cleaner and dust particles pushed out by the pipe cleaner, so as to recover the dust particles and the pipe cleaner.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

After reading the detailed description of optimal implementations below, various other advantages and benefits will become clear to a person of ordinary skill in the art. The drawings are for the purpose of illustrating the preferred embodiments only and are not to be considered a limitation to the present application. In addition, in all the accompanying drawings, the same reference symbol is used to represent the same part. In the drawings.

Figure 1:
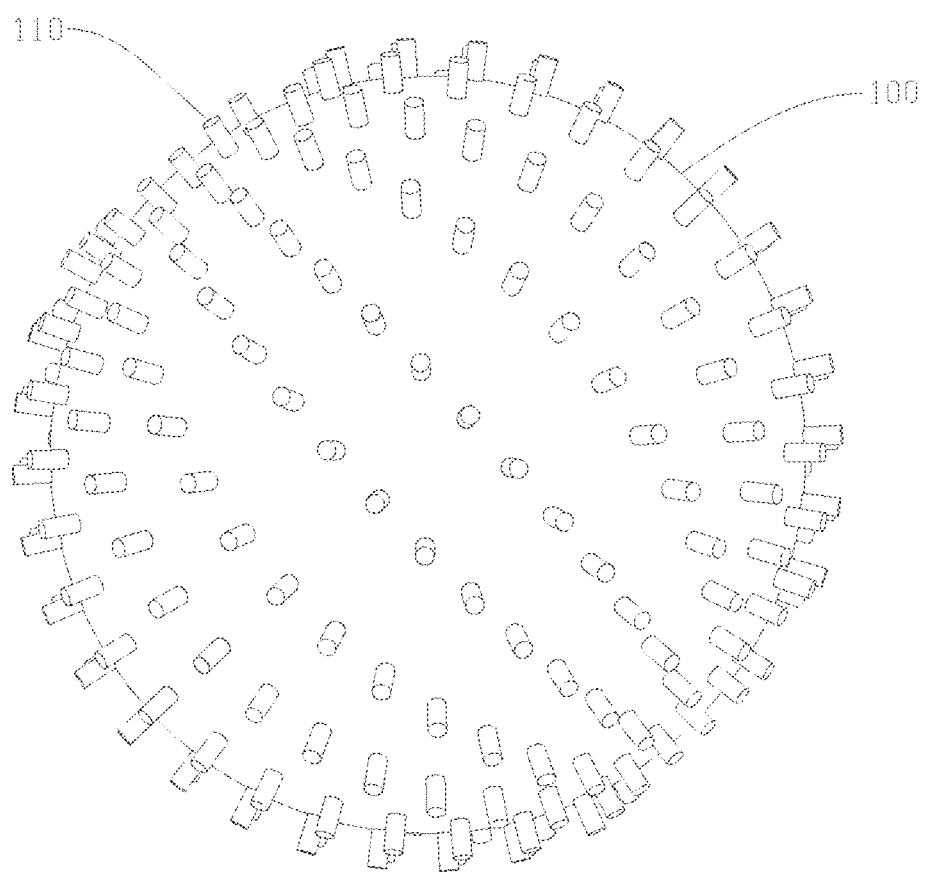
FIG. 1 is a schematic structural diagram of a pipe cleaner according to an embodiment of the present application.

Wherein: body 100; cleaning portion 110; magnetic positioning member 120; pipeline 200; gas inlet 210; dust treatment device 300; machining equipment 400.

DETAILED DESCRIPTION

The following clearly and completely describes the technical solutions in the embodiments of the present application with reference to the accompanying drawings in the embodiments of the present application. Apparently, the described embodiments are only a part rather than all of the embodiments of the present application. All other embodiments obtained by a person of ordinary skill in the art based on the embodiments of this application without creative efforts shall fall within the protection scope of this application.

Unless otherwise defined, all technical and scientific terms used herein have the same meaning as commonly understood by a person skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, "a plurality of" means two or more, unless specifically limited otherwise.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of this application, the term "and/or" simply describes the association relation of the associated objects, indicating that there can be three relations, such as A and/or B, indicating that A exists alone, A and B exist simultaneously, and B exists alone. In addition, the character "I" herein generally means that the associated objects before and after it are in an "or" relationship.

In the description of the embodiments of the present application, the term "a plurality of" refers to two or more (including two). Similarly, "a plurality of groups" refers to two or more (including two groups), and "a plurality of pieces" refers to two or more (including two pieces).

In the description of the embodiments of this application, a direction or a position relation indicated by the technical terms "center", "longitudinal", "lateral", "length", "width", "thickness", "upper", "lower", "front", "rear", "left", "right", "vertical", "horizontal", "top", "bottom", "inside", "outside", "clockwise", "counter clockwise", "axial", "radial", and "circumferential" are based on the location or position shown in the drawings for the convenience and brevity of the description of embodiments of this application, but do not indicate or imply that the apparatus or component referred to must be located or constructed and operated in the specified direction, and therefore, such terms are not constructed as a limitation on the embodiments of this application.

In the description of the embodiments of this application, unless otherwise expressly specified and defined, the technical terms such as "install", "concatenate", "connect", and "fix" are understood in a broad sense. For example, a "connection" may be a fixed connection, a detachable connection, or an integrated connection; a mechanical connection or an electrical connection; a direct connection, or an indirect connection implemented through an intermediary, and may be an internal conduct of two components or an interaction of two components. For a person of ordinary skill in the art, specific meanings of the foregoing terms in the embodiments of the present application may be understood based on a specific case.

For some pipelines used to deliver dust particles, after long-term use of the pipeline, dust particles are often attached to the pipeline. Currently, a pigging ball for cleaning the pipeline is commonly used, the pigging ball is put into the to-be-cleaned pipeline, and then moves along the pipeline to remove the dust particles attached to the inner wall of the pipeline.

However, for some pipelines containing hazardous dust particles such as flammable and explosive materials (such as aluminum powder and magnesium powder), due to limitations such as related structure and material of the pigging ball, during the cleaning process of the pigging ball moving along the pipeline, static electricity may be generated due to the contact and friction with the pipe wall. The inventor has found that although some of static electricity may be guided out through the pipe wall, some of static electricity may still accumulates on the pigging ball and cannot be guided out. When there is enough static electricity accumulates on the pigging ball, it will react with hazardous dust particles, causing safety accidents such as combustion or even explosion, resulting in corresponding economic losses.

Figure 2:
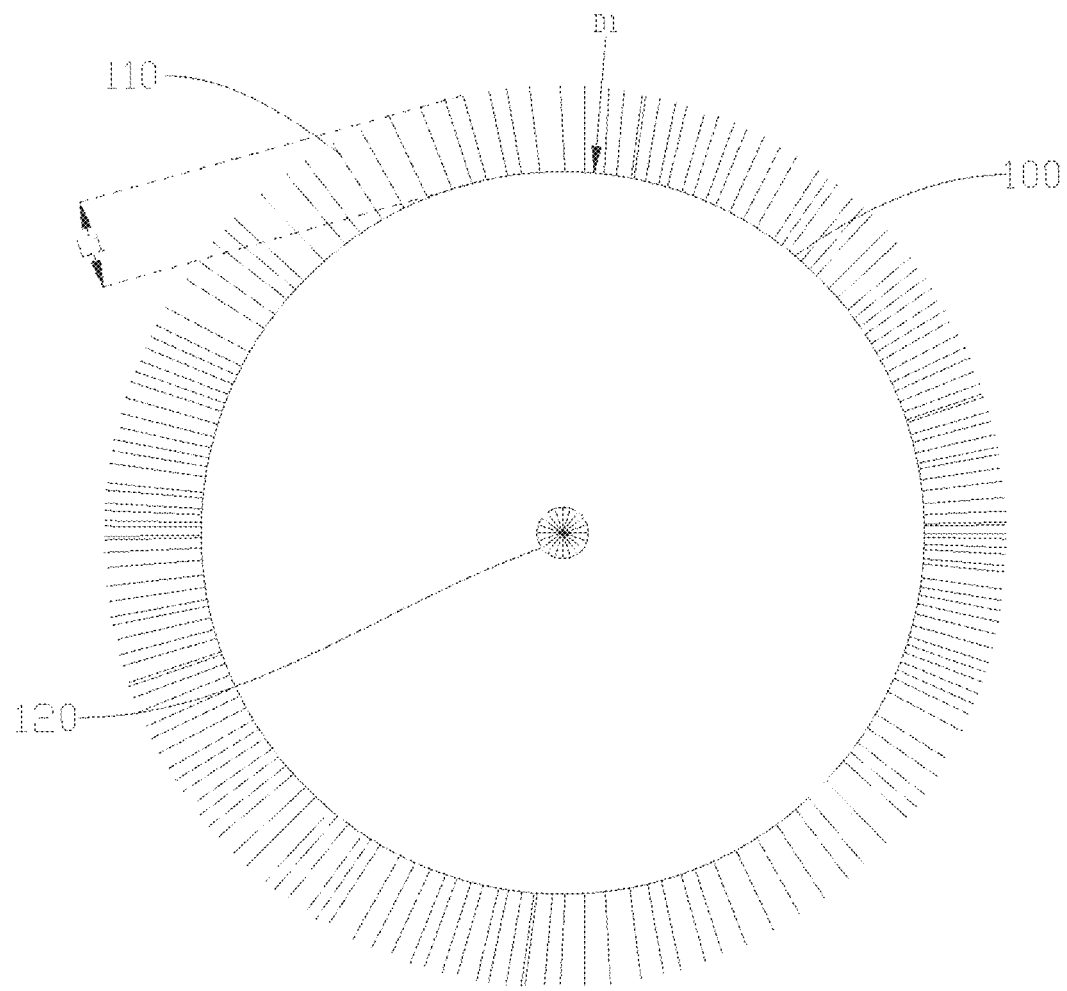
FIG. 2 is a schematic diagram of a cross-sectional structure of a pipe cleaner according to an embodiment of the present application.

Based on the above background, referring to FIGS. 1 and 2, the present application provides a pipe cleaner, the pipe cleaner is applied to a to-be-cleaned pipeline. The pipe cleaner comprises a body 100 and a cleaning portion 110, where the cleaning portion 110 is arranged on the surface of the body 100, and the cleaning portion 110 is configured as a conductive structure. Further, when the body 100 moves along the pipeline, the cleaning portion 110 is capable of pushing out dust particles in the pipeline toward the tail end of the pipeline, and guiding out static electricity generated by friction with the pipeline.

It should be noted that, in the present application, the body 100 of the pipe cleaner may be of a spherical structure, so as to adapt to a complex structure of the pipeline, and enables the pipe cleaner to clean the pipeline in a rolling manner. In addition, for some bended pipelines, the pipe cleaner can also change the rolling direction with the trajectory of the pipeline so as to prevent the pipe cleaner from being clogged at a corner or round transition area of the pipeline. Of course, according to the actual shape of the to-be-cleaned pipeline, the body 100 of the pipe cleaner may also be correspondingly arranged to be a regular shape adapted to the cross-sectional shape of the pipeline, such as an ellipsoid shape, a rugby shape, or other rotating body.

In addition, when the pipe cleaner in the present application is applied in a to-be-cleaned pipeline and moves in the to-be-cleaned pipeline, the cleaning portion 110 will contact with dust particles in the pipeline, a part of the dust particles may be attached to the cleaning portion 110, and then being carried out from the pipeline by the pipe cleaner; meanwhile, when the pipe cleaner moves in the to-be-cleaned pipeline 200, the cleaning portion 110 is able to push out dust particles in the pipeline toward the tail end of the pipeline 200, thereby removing dust particles in the pipeline.

In addition, it should be understood that, in the present application, the to-be-cleaned pipeline is a metal pipeline, and the to-be-cleaned pipeline is always in a grounded state. When static electricity is generated due to contact and friction between the cleaning portion 110 and the inner wall of the pipeline, a part of the static electricity is directly guided out through the pipe while the other part of the static electricity is attached to the cleaning portion 110. By means of the conductivity of the cleaning portion 110, the cleaning portion 110 being attached with a part of static electricity is capable of guiding out this part of static electricity in time through the contact with the inner wall of the pipeline. In this way, the static electricity generated by the friction between the cleaning portion 110 and the pipe wall is guided out through the pipeline 200 during the process of cleaning dust particles in the pipeline.

Obviously, in the pipe cleaner of the present application, by providing a corresponding cleaning portion 110 on the surface of the body 100, the cleaning portion 110 is capable of pushing out dust particles in the pipeline to the tail end of the pipeline 200 when the pipe cleaner moves in the to-be-cleaned pipeline 200, and at the same time, the cleaning portion 110 is able to contact and friction with the inner wall of the pipeline 200, so as to push down the dust particles attached to the inner wall of the pipeline 200, so that the dust particles attached to the inner wall of the pipeline 200 and the dust particles in the pipeline 200 are pushed out to the tail end of the pipeline 200 together, thereby completing the cleaning of the pipeline 200.

In addition, in the present application, by arranging the cleaning portion 110 as a conductive structure, it is able to utilize the conductivity of the cleaning portion 110 to effectively guide out the static electricity generated by friction between the cleaning portion 110 and the pipe wall through the pipeline 200 during the process of cleaning dust particles in the pipeline with the pipe cleaner, and effectively prevent the static electricity from being accumulated at the cleaning portion 110 and the surface of the pipe cleaner and reacting with hazardous dust particles, thereby not only ensuring the cleaning effect for the pipeline, but also ensuring safety in the process of cleaning dust particles in the pipeline with a pipe cleaner, and safety accidents such as combustion and explosion are avoided.

In some embodiments of the present application, referring to FIGS. 1 and 2, the cleaning portion 110 is a plurality of conductive brushes arranged on the surface of the body 100.

Optionally, the conductive brushes are integrally formed with the body 100 in a manner of being directly implanted on the surface of the body 100, and the plurality of conductive brushes are spaced and uniformly distributed along the surface contour of the body 100, and lengths of all the conductive brushes are substantially equal so as to ensure the overall structural aesthetics of the pipe cleaner. Similarly, the material of the conductive brushes may be one of carbon fiber and modified nylon, so that the conductive brushes further have a certain elasticity. During the process of cleaning the pipeline with the pipe cleaner, the conductive brushes brush off the dust particles attached to the inner wall of the pipeline and push them out to the tail end of the pipeline. In this process, the conductive brushes may have a slight deformation due to friction and collision with the pipe wall in order to adapt to the inner diameter of the pipeline, so as to better brush off the dust particles on the inner wall of the pipeline.

In the present application, the cleaning portion 110 is arranged to be of a conductive brush structure, on one hand, it is capable of adapting to the granular dust particles exist in the pipeline, which enables a small amount of dust particles floating in the pipeline to contact with the conductive brushes and thereby attaching to the conductive brushes during the process of pushing the dust particles in the pipeline towards the tail end of the pipeline as a whole by the pipe cleaner, and then being carried out by the pipe cleaner and removed, thereby improving the cleaning quality of the pipeline; on the other hand, by arranging the cleaning portion 110 to be of a conductive brush structure, so that the manner of frictional contact between the cleaning portion 110 and the inner wall of the pipeline is point contact, the thrust of the cleaning portion 110 on the dust particles attached to the inner wall of the pipeline is increased, thereby ensuring that the dust particles attached to the inner wall of the pipeline can be completely brushed off by the conductive brushes, avoiding remaining of the dust particles on the inner wall of the pipeline, and further improving the cleaning quality of the pipeline.

In some embodiments of the present application, referring to FIGS. 1 and 2, the cleaning portion 110 is distributed along the surface contour of the body 100, and an area occupied by the cleaning portion 110 on the surface of the body 100 is 65% to 80% of the surface area of the body 100.

It should be noted that the area occupied by the cleaning portion 110 on the surface of the body 100 is the sum of contact areas between the cleaning portion 110 and the surface of the body 100.

The cleaning portion 110 is conductive brushes implanted on the surface of the body 100, and all the conductive brushes are substantially equal in length, the body 100 may be of a spherical structure. It is not difficult to understood that, in this case, the cleaning portion 110 is in a spherical shape adapt to the surface contour of the body 100, and an area of the body 100 occupied by the cleaning portion 110 on the body 100 is preferably 70% of the surface area of the body 100, that is, the surface area of the body 100 used for arranging the cleaning portion 110 in the shape of conductive brushes occupies 70% of the surface area of the body 100.

By means of the above arrangement, excessive density of the conductive brushes distributed on the surface of the body 100 is avoided, thereby preventing the pipe cleaner from being clogged in the pipeline due to excessive pipe wall resistance during the process of cleaning the pipeline; meanwhile, low density of the conductive brushes distributed on the surface of the body 100 is also avoided, thereby ensuring the cleaning effect of the cleaning portion 110 on the pipeline.

In some embodiments of the present application, the cross-sectional shape of the body 100 is adapted to the cross-sectional shape of the pipeline, ensuring that the shape of the body 100 effectively adapts to the cross-sectional shape of the pipeline, and ensuring that the pipe cleaner can roll or move smoothly along the pipeline, and further preventing the pipe cleaner from being clogged in the pipeline.

When the shape of the body 100 is designed, according to the actual shape of the to-be-cleaned pipeline, the body 100 of the pipe cleaner may be correspondingly arranged to a regular shape adapted to the cross-sectional shape of the pipeline, such as sphere, an ellipsoid shape, a rugby shape, or other rotating body. That is, the shape of the body 100 of the pipe cleaner is specifically adapted according to the cross-sectional shape of the pipeline, so as to ensure that the pipe cleaner can roll or move smoothly along the pipeline, and further preventing the pipe cleaner from being clogged in the pipeline.

In some embodiments of the present application, referring to FIGS. 1 and 2, the body 100 is in a spherical shape.

In an exemplary embodiment, the body 100 is in a round ball structure to enable the body 100 and the entire pipe cleaner to adapt to a complex pipeline structure, and enable the pipe cleaner to clean the pipeline in a rolling manner, meanwhile, for some bended pipelines, the pipe cleaner can also change the rolling direction accordingly with the trajectory of the pipeline so as to prevent the pipe cleaner from being clogged at a corner or round transition area of the pipeline.

In some embodiments of the present application, referring to FIGS. 1 and 2, the length of the cleaning portion 110 is 15% to 20% of the diameter of the body 100.

Likewise, in this case, the body 100 is in a spherical shape, and the cleaning portion 110 are conductive brushes arranged on the surface of the body 100, all the conductive brushes have the same length. For example, in an embodiment, referring to FIG. 2, diameter D1 of the body 100 is 63 mm, and length L1 of the conductive brush may be 10 mm or 12 mm; in another embodiment, for example, diameter D1 of the body 100 is 89 mm, length L1 of the conductive brush may be 14 mm or 17 mm, so as to control the length of the conductive brushes to be within a suitable range, so that the length of the conductive brushes can be better adapted to the diameter of the body 100.

In addition, it is not difficult to understand that, during actual usage of the pipe cleaner, the diameter of the body 100 is slightly smaller than the inner diameter of the pipeline, the sum of the diameter of the body 100 and the length of a single conductive brush is slightly larger than the inner diameter of the pipeline, and the conductive brushes have a certain elasticity, which enables the pipe cleaner to enter the pipeline smoothly and perform cleaning to pipeline, and also enables the conductive brushes on the surface of the body 100 of the pipe cleaner to contact each part of the pipe wall, thereby realizing comprehensive cleaning of dust particles attached to the pipe wall.

By means of the above arrangement in the present application, it is also able to avoid excessive length of the cleaning portion 110 when it is conductive brushes, and further prevent the pipe cleaner from being clogged in the pipeline during the process of cleaning the pipeline, enabling the volume of the entire pipe cleaner to be better adapted to the inner diameter of the pipeline, and better cleaning effect of the cleaning portion 110 on dust particles attached to the inner wall of the pipeline is ensured.

In some embodiments of the present application, the material of the cleaning portion 110 comprises one of carbon fiber and modified nylon. That is, the cleaning portion 110 is made of carbon fiber or modified nylon.

It should be noted that the carbon fiber has good conductivity and has characteristics such as high strength, friction resistance, fire resistance, and non-flammability. When the carbon fiber material is made into the cleaning portion 110, it is ensured that the cleaning portion 110 has good conductivity and good structural strength.

On one hand, the static electricity generated by friction between the cleaning portion 110 and the pipe wall can be guided out to the pipeline in time through the cleaning portion 110, so as to prevent the static electricity from accumulating on the cleaning portion 110 and reacting with the hazardous dust particles in the pipeline, which in turn causing safety accidents such as combustion or even explosion;

On the other hand, the overall structural strength of the cleaning portion 110 and the pipe cleaner is also enhanced, ensuring that the cleaning portion 110 can efficiently push out dust particles in the pipeline to the tail end of the pipeline.

Similarly, the modified nylon may be conductive nylon with high-strength, when the modified nylon material is made into the cleaning portion 110, it not only ensures the electrostatic conductivity of the cleaning portion 110 but also enables the cleaning portion 110 to have good structural strength.

Obviously, in the present application, the material for manufacturing the cleaning portion 110 is selected from one of carbon fiber and modified nylon, which not only ensures a good electrostatic conductivity and structural strength of the cleaning portion 110, but also significantly reduces the weight of the cleaning portion 110 due to the fact that the carbon fiber and modified nylon are light-weight materials, and further reduces the structural weight of the entire pipe cleaner, so as to maintains good lightness of the pipe cleaner and improve the cleaning efficiency of the pipe cleaner on dust particles in the pipeline.

Of course, the conductive material used for manufacturing the cleaning portion 110 may also be other materials with high strength, good conductivity, as well as fireproof and flame retardant properties, which is not specifically limited.

In some embodiments of the present application, the body 100 is configured as a conductive structure.

In some exemplary embodiments, the body 100 is made of conductive material, and the conductive material used to make the body 100 may be conductive carbon black or POM (polyformaldehyde resin) plastic added with carbon fiber or conductive carbon black material, which makes the body 100 has good conductivity, and at the same time also makes the body 100 has good structural strength.

For the pipe cleaner, when the body 100 is in a spherical shape, considering that there is a small part of the surface of the body 100 without the cleaning portion 110, that is, a part of the surface of the body 100 which is not implanted with the conductive brush, during the process of cleaning dust particles in the pipeline with the pipe cleaner, the static electricity generated by friction between the cleaning portion 110 and the pipe wall will partially attached to the void surface of the body 100.

In order to guide out the static electricity attached to the void surface of the body 100, in the present application, the body 100 is arranged as a conductive structure, that is, the body 100 is made of conductive material so that the body 100 is a conductor, which prevents static electricity generated by friction between the cleaning portion 110 and the pipe wall during the process of cleaning dust particles in the pipeline with the pipe cleaner from accumulating on the surface of the body 100, and ensures that the body 100 is capable of directly guiding out static electricity on the surface thereof through the pipeline, or indirectly guiding out static electricity on the surface of the body 100 through contact between the cleaning portion 110 on the body 100 and the pipeline, which further prevents the static electricity from accumulating on the body 100 and the cleaning portion 110, ensuring safety in the process of cleaning dust particles in the pipeline with the pipe cleaner, and avoiding safety accidents such as combustion and explosion.

In some embodiments of the present application, referring to FIGS. 1 and 2, the interior of the body 100 is provided with a magnetic positioning member 120.

In some exemplary embodiments, the shape of the magnetic positioning member 120 is adapted to the shape of the body 100, that is, when the body 100 is in a spherical structure, the magnetic positioning member 120 is also a regular magnetic ball, and the center of the magnetic positioning member 120 coincides with the center of the body 100, so as to ensure that the gravity center of the pipe cleaner coincides with the center of thereof, thereby ensuring movement stability of the pipe cleaner in the pipeline.

It should be noted that, in the present application, by arranging the magnetic positioning member 120 inside the body 100, it is convenient for the operator to configure a magnetic sensor that is inductively fitted with the magnetic positioning member 120 on the pipeline, so that the magnetic sensor is able to sense the position of the pipe cleaner in the pipeline, realizing real-time positioning of the pipe cleaner moving in the pipeline, and simplifying the difficulty for operators to solve blockages or other faults in the pipeline.

Figure 3:
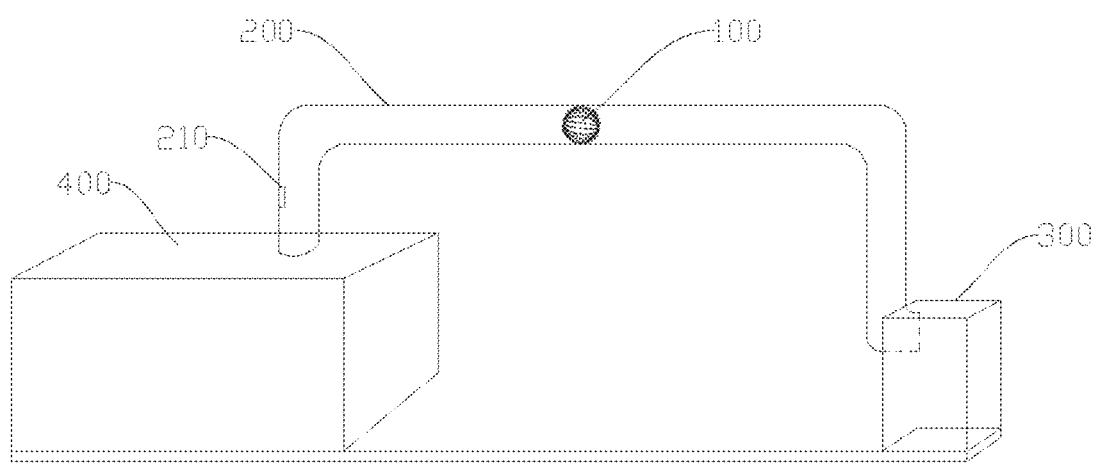
FIG. 3 is a schematic structural diagram of a pipeline cleaning system according to an embodiment of the present application.
Figure 4:
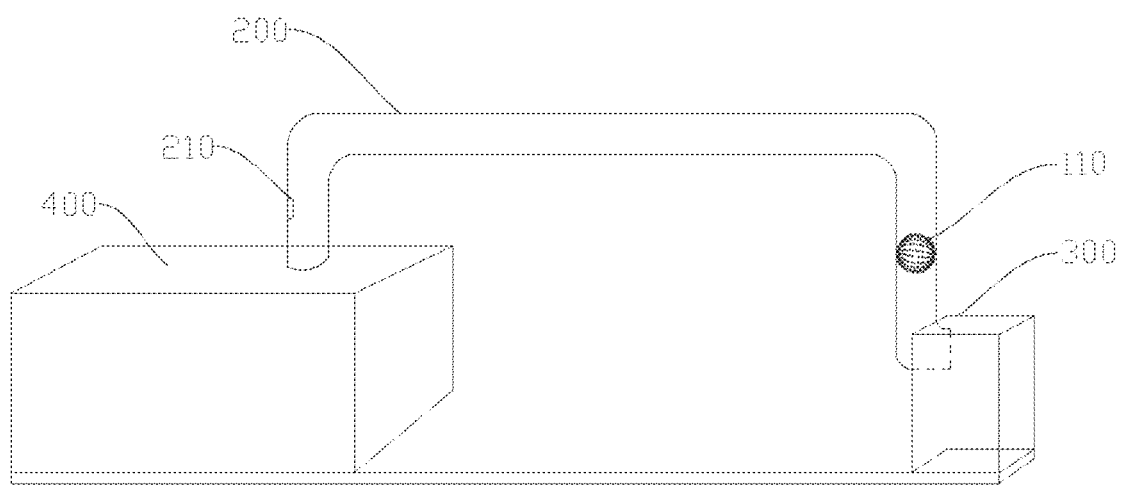
FIG. 4 is another schematic structural diagram of a pipeline cleaning system according to an embodiment of the present application.

In addition, referring to FIGS. 3 and 4, the present application further provides a pipeline cleaning system, including a pipeline 200 and the above-described pipe cleaner, where the pipe cleaner is movably arranged in the pipeline 200 and is able to move along the pipeline 200.

It should be noted that, when the pipeline cleaning system of the present application is actually applied, the front end of the pipeline 200 usually communicates with a machining equipment 400. The hazardous dust particles generated by operation of this type of machining equipment 400 are introduced into the pipeline 200. This type of machining equipment 400 is prone to generate hazardous dust particles, such as laser welding equipment, dryer, or pulverizer. The tail end of the pipeline 200 is docked with a corresponding tail end receiving device for receiving hazardous dust particles so as to perform treatment to the hazardous dust particles being pushed out from the pipe cleaner.

The pipeline cleaning system in the present application is provided with the above described pipe cleaner, therefore, it also has the same technical effect brought by the pipe cleaner, that is, the conductivity of the cleaning portion 110 on the surface of the pipe cleaner body 100 can be utilized, so as to effectively guide out the static electricity generated by friction between the cleaning portion 110 and the pipe wall through the pipeline 200 during the process of cleaning dust particles in the pipeline with the pipe cleaner, and effectively prevent the static electricity from accumulating on the cleaning portion 110 and the surface of the pipe cleaner and reacting with hazardous dust particles, thereby not only ensuring the cleaning effect for the pipeline 200, but also ensuring the safety during the process of moving the pipe cleaner along the pipeline 200 and cleaning dust particles in the pipeline, and safety accidents such as combustion and explosion are avoided.

In some embodiments of the present application, referring to FIGS. 3 and 4, the pipeline cleaning system further includes a gas delivery device (not shown in the figures), an outer wall of the pipeline 200 is provided with a gas inlet 210 for communicating an output end of the gas delivery device, and the gas delivery device is used to deliver inert gas into the pipeline 200 to drive the pipe cleaner to move along the pipeline 200.

It should be noted that the inert gas used to drive the pipe cleaner rolling along the pipeline 200 has a high pressure, which allows the pipe cleaner to moves rapidly along the pipeline 200, and improves the cleaning efficiency of the pipe cleaner on the pipeline 200. In addition, the gas inlet 210 is disposed on an outer wall of one end of the pipeline 200 close to the machining equipment 400. The gas inlet 210 may be a valve, and the gas inlet 210 may also serve as an entrance for pipe cleaner. After the operator puts the pipe cleaner into the pipeline 200, the gas delivery device may provide inert gas into the pipeline through the gas inlet 210, thereby pushing the pipe cleaner to move along the pipeline 200 so as to clean dust particles in the pipeline.

Of course, when the body 100 is in a spherical structure, the corresponding inert gas pushes the pipe cleaner to roll along the pipeline 200, thereby improving the cleaning efficiency of the pipeline 200.

It should be understood that, by means of the above arrangement in the present application, on one hand, the gas delivery device injects inert gas into the pipeline 200, ensuring that the pipe cleaner is driven by a driving force to move along the pipeline 200, so that the pipe cleaner is moved forward from the front end of the pipeline to the tail end of the pipeline, so as to push out dust particles in the pipeline and dust particles attached to the inner wall of the pipeline, thereby completing overall cleaning of the pipeline; on the other hand, by using the inert gas as a power source for pushing the pipe cleaner to move along the pipeline, and utilizing the feature that the inert gas does not react with other substances, chemical reaction between inert gas has and the hazardous dust particles in the pipeline is directly avoided. In addition, the inert gas also has an effect of making the hazardous dust particles inert to some extent, that is, inerting explosion suppression is applied to the hazardous dust particles, thereby further avoiding safety accident such as combustion and explosion.

In some embodiments, the inert gas is nitrogen.

It can be understood that, compared with other inert gas delivery devices, the cost of nitrogen delivery device is low, so as to reduce the cost of the power source for pushing the pipe cleaner to move along the pipeline. Similarly, the nitrogen has an effect of making the hazardous dust particles in the pipeline inert to some extent, and the safety of the process of moving the pipe cleaner along the pipeline 200 and cleaning dust particles in the pipeline is further ensured.

In some embodiments of the present application, referring to FIGS. 3 and 4, a dust treatment device 300 is connected with the tail end of the pipeline 200, the dust treatment device 300 is capable of applying a negative pressure to the pipeline 200 by means of pumping, and used for receiving dust particles in the pipeline 200 and the pipe cleaner attached with dust particles.

In some exemplary embodiments, the front end and the tail end of the pipeline 200 are respectively connected with a machining equipment that generates dust particles and a dust treatment device 300 that receives dust particles, in this case, the pipe cleaner also moves along the pipeline to push accumulated dust particles in the pipeline into the dust treatment device 300.

The dust treatment device 300 may be a single-piece dust remover. When there are only a small amount of dust particles in the pipeline, an operator may take out the pipe cleaner, and directly use the dust treatment device 300 to apply a negative pressure to the pipeline by means of pumping, so as to suck out dust particles in the pipeline, thereby achieving a cleaning and purifying effect. When there are a lot of dust particles accumulated in the pipeline, the dust treatment device 300 and the pipe cleaner may operate simultaneously to clear dust particles accumulating in the pipeline and dust particles attached to the pipe wall.

It is not difficult to understand that, in the present application, by means of the arrangement of the dust treatment device 300, on one hand, the dust treatment device 300 is capable of sucking out dust particles floating in the pipeline during the process of applying a negative pressure to the pipeline 200 by means of pumping, thereby improving the pipeline cleaning efficiency; on the other hand, the dust treatment device 300 is further used to receive the pipe cleaner and dust particles pushed out by the pipe cleaner, so as to recover dust particles and the pipe cleaner, facilitating subsequent processing of the received dust particles.

In some embodiments of the present application, the dust treatment device 300 is further used to make the received dust particles inert.

Similarly, the dust treatment device 300 may be a single-piece dust remover, the dust treatment device 300 may be equipped with a powder or spray explosion suppression system according to the risk of explosion of hazardous dust, and the explosion suppression system sprays inert gas or sodium bicarbonate powder to the received dust pile, so as to avoid combustion or explosion of dust. The dust treatment device 300 makes the received hazardous dust particles inert in the above manner, so as to reduce the risk factor of the hazardous dust particles during subsequent processing and achieve the effect of suppressing combustion and explosion of the hazardous dust particles.

According to some embodiments of the present application, referring to FIGS. 1 and 2, the present application provides a pipe cleaner, the pipe cleaner is applied to a to-be-cleaned pipeline. The pipe cleaner comprises a body 100 and a cleaning portion 110, wherein the cleaning portion 110 is arranged on the surface of the body 100, and the cleaning portion 110 is configured as a conductive structure. In addition, when the body 100 moves along the pipeline, the cleaning portion 110 is capable of pushing out dust particles in the pipeline toward the tail end of the pipeline, and guiding out static electricity generated by friction with the pipeline.

In the pipe cleaner of the present application, by arranging the cleaning portion 110 provided on the surface of the body 100 as a conductive structure, it is able to utilize the conductivity of the cleaning portion 110 to effectively guide out the static electricity generated by friction between the cleaning portion 110 and the pipe wall through the pipeline 200 during the process of cleaning dust particles in the pipeline with the pipe cleaner, and effectively prevent the static electricity from being accumulated at the cleaning portion 110 and the surface of the pipe cleaner and reacting with hazardous dust particles, thereby not only ensuring the cleaning effect for the pipeline, but also ensuring safety in the process of cleaning dust particles in the pipeline with a pipe cleaner, and safety accidents such as combustion and explosion are avoided.

According to some embodiments of the present application, referring to FIGS. 3 and 4, the present application further provides a pipeline cleaning system. The pipeline cleaning system comprises a pipeline 200 and the foregoing pipe cleaner. The pipe cleaner is movably arranged in the pipeline 200 and is able to move along the pipeline 200.

The pipeline cleaning system in the present application is provided with the above described pipe cleaner, therefore, it also has the same technical effect brought by the pipe cleaner, that is, the conductivity of the cleaning portion 110 on the surface of the pipe cleaner body 100 can be utilized, so as to effectively guide out the static electricity generated by friction between the cleaning portion 110 and the pipe wall through the pipeline 200 during the process of cleaning dust particles in the pipeline with the pipe cleaner, and effectively prevent the static electricity from accumulating on the cleaning portion 110 and the surface of the pipe cleaner and reacting with hazardous dust particles, thereby not only ensuring the cleaning effect for the pipeline 200, but also ensuring the safety during the process of moving the pipe cleaner along the pipeline 200 and cleaning dust particles in the pipeline, and safety accidents such as combustion and explosion are avoided.

The technical features of the above embodiments can be combined arbitrarily. In order to make the description concise, not all possible combinations of the technical features in the above embodiments are described. However, all the combinations of the technical features should be considered as falling within the scope described in this specification provided that they do not conflict with each other.

The embodiments above only describe several implementations of the present application, and the description thereof is specific and detailed, but cannot be understood as a limitation on the scope of the present application. It should be noted that those of ordinary skill in the art may further make variations and improvements without departing from the concept of the present application, all of which fall within the protection scope of the present application. Therefore, the patent protection scope of the present application should be subject to the appended claims.

What is claimed is:

1. A pipe cleaner, which is applied to a to-be-cleaned pipeline, comprising:

a body, a surface of the body being provided with a cleaning portion;

wherein the cleaning portion is configured as a conductive structure, when the body moves along the pipeline, the cleaning portion is capable of pushing out dust particles in the pipeline to a tail end of the pipeline, and guiding out static electricity generated by friction with the pipeline;

wherein the cleaning portion is a plurality of conductive brushes arranged on the surface of the body;

wherein an area occupied by the cleaning portion on the surface of the body is 65% to 80% of the surface area of the body;

wherein the area occupied by the cleaning portion on the surface of the body is a sum of contact areas between the cleaning portion and the surface of the body, and wherein the length of the cleaning portion is 15% to 20% of the diameter of the body.

2. The pipe cleaner according to claim 1, wherein the cross-sectional shape of the body is adapted to the cross-sectional shape of the pipeline.

3. The pipe cleaner according to claim 1, wherein the body is of a spherical shape.

4. The pipe cleaner according to claim 1, wherein the plurality of conductive brushes are spaced and uniformly distributed along a surface contour of the body.

5. The pipe cleaner according to claim 1, wherein the body is integrally formed with the conductive brush.

6. The pipe cleaner according to claim 1, wherein the body is of an ellipsoid shape.

7. The pipe cleaner according to claim 1, wherein the body is of a rugby ball shape.

8. The pipe cleaner according to claim 1, wherein the material of the cleaning portion comprises one of carbon fiber and modified, electro-statically conductive nylon.

9. The pipe cleaner according to claim 1, wherein the body is configured as a conductive structure.

10. The pipe cleaner according to claim 1, wherein the interior of the body is provided with a magnetic positioning member.

11. The pipe cleaner according to claim 1, wherein the diameter of the body is smaller than an inner diameter of the pipeline and a sum of the diameter of the body and a length of a single conductive brush among the plurality of conductive brushes is larger than the inner diameter of the pipeline.

12. A pipeline cleaning system, comprising:
a pipeline; and
the pipe cleaner according to claim 1;
wherein the pipe cleaner is movably arranged in the pipeline and is able to move along the pipeline.

13. The pipeline cleaning system according to claim 12, wherein the pipeline cleaning system further comprises a gas delivery device, an outer wall of the pipeline is provided with a gas inlet for communicating with an outlet end of the gas delivery device, and the gas delivery device is used to deliver inert gas into the pipeline to drive the pipe cleaner to move along the pipeline.

14. The pipeline cleaning system according to claim 12, wherein the tail end of the pipeline is connected with a dust treatment device, the dust treatment device is capable of applying a negative pressure to the pipeline by means of pumping, and is used for receiving dust particles in the pipeline and the pipe cleaner attached with dust particles.

15. The pipeline cleaning system according to claim 13, wherein the inert gas is nitrogen.

16. The pipeline cleaning system according to claim 14, wherein the dust treatment device further comprises an explosion suppression system to spray the received dust particles with an explosion suppression substance including at least one of an inert gas and sodium bicarbonate powder.

17. The pipeline cleaning system according to claim 16, wherein the explosion suppression substance is the inert gas.

18. The pipeline cleaning system according to claim 16, wherein the explosion suppression substance is the sodium bicarbonate powder.

* * * * *